United States Patent
Quercetti

(12) 
(10) Patent No.: US 6,315,628 B1
(45) Date of Patent: Nov. 13, 2001

(54) SYSTEM OF ELEMENTS FOR THE COMPOSITION OF STATIC OR DYNAMIC CONSTRUCTIONS

(76) Inventor: Alessandro Quercetti, Strada San Vito a Revigliasco 48, I-10133 Torino (IT)

(*) Notice: Subject to any disclaimer, the term of this patent is extended or adjusted under 35 U.S.C. 154(b) by 0 days.

(21) Appl. No.: 09/484,277

(22) Filed: Jan. 18, 2000

(30) Foreign Application Priority Data

Jan. 20, 1999 (IT) .............................................. TO99A0036

(51) Int. Cl.[7] .................................................. A63H 33/08
(52) U.S. Cl. .......................... 446/128; 446/103; 446/117
(58) Field of Search .................................. 446/102, 103, 446/117, 120, 124, 128

(56) References Cited

U.S. PATENT DOCUMENTS

| | | | |
|---|---|---|---|
| 3,605,322 | * 9/1971 | Matsubayashi et al. | 446/128 |
| 4,164,091 | * 8/1979 | Lin | 446/128 X |
| 4,919,635 | * 4/1990 | Bertrand | 446/128 |
| 5,057,049 | * 10/1991 | Kaczperski | 446/124 X |
| 5,795,210 | * 8/1998 | Kushner et al. | 446/117 X |

FOREIGN PATENT DOCUMENTS

| | | | |
|---|---|---|---|
| 128398 | * 7/1948 | (AU) | 446/128 |
| 1357579 | * 2/1964 | (FR) | 446/128 |
| 452893 | * 9/1936 | (GB) | 446/117 |
| 160144 | 3/1974 | (IT) . | |
| 1147731 | 11/1986 | (IT) . | |

OTHER PUBLICATIONS

3 Pages of a 1974 Catalogue of the Company Quercetti.

* cited by examiner

*Primary Examiner*—John A. Ricci
(74) *Attorney, Agent, or Firm*—Young & Thompson

(57) ABSTRACT

A system of elements of plastic material intended for the composition, by frictional insertion, of static or dynamic constructions having a game of didactic purpose, which comprises two kinds of main system elements, from which the first kind of elements has the character of a substantially tubular spacer whose end portions form female coupling members having a symmetry of order eight, while the second kind of elements has the character of a connector formed by a thin flange provided on both sides with male coupling members complementary to the female coupling members of the elements of the first kind but having a symmetry of order four. Preferably, the male coupling members of the elements of the second kind comprise, on each side of the flange, four hollow cylindrical sleeves having circular cross section, and the female coupling members of the elements of the first kind are embodied by the shaping of the walls of the tubular elements, which walls are determined, in cross section, by eight circle arcs whose inner radius is equal to the outer radius of the cylindrical sleeves of the elements of the second kind.

14 Claims, 1 Drawing Sheet

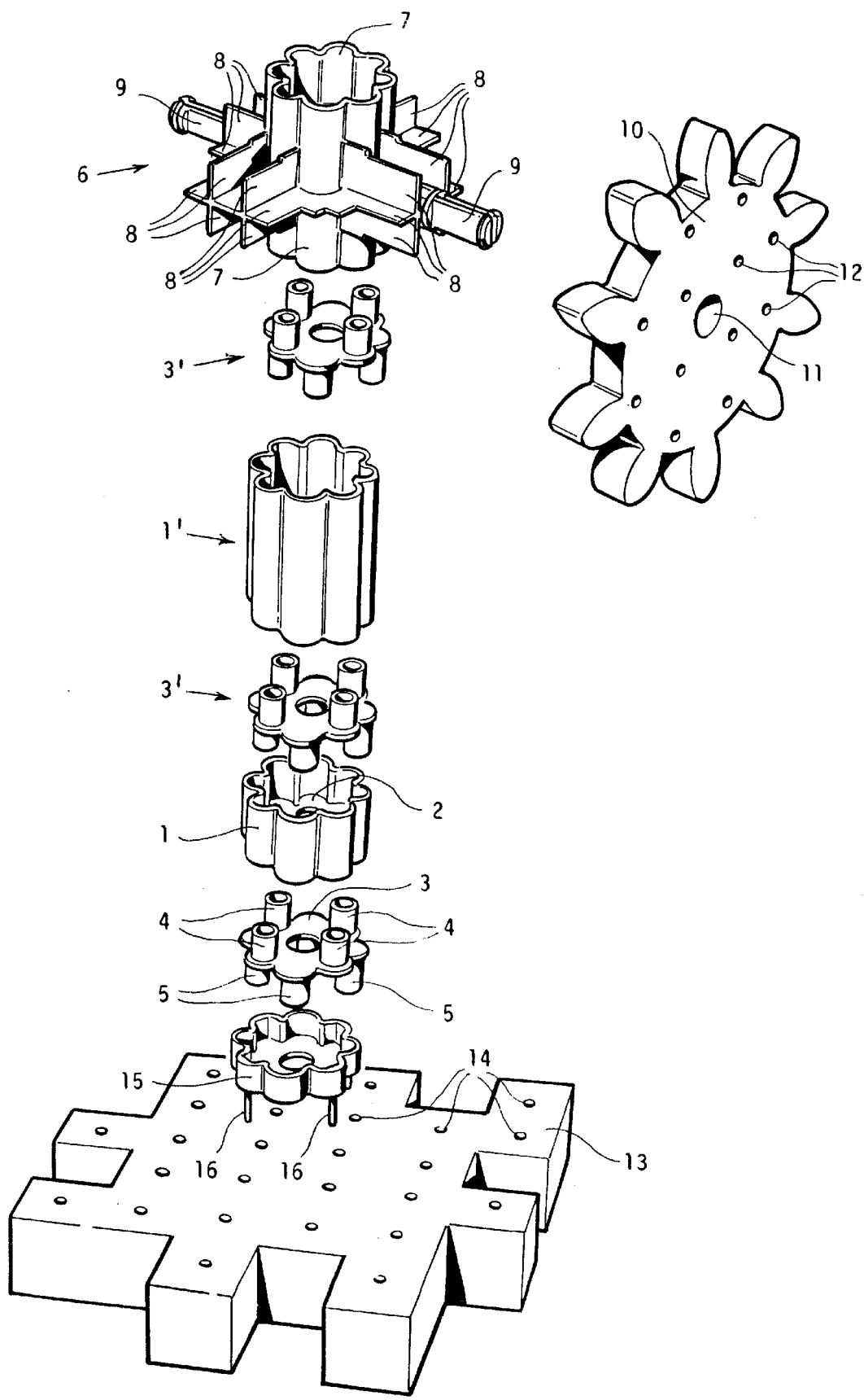

SYSTEM OF ELEMENTS FOR THE COMPOSITION OF STATIC OR DYNAMIC CONSTRUCTIONS

BACKGROUND OF THE INVENTION

This invention refers to a system of elements of plastic material intended for the composition, by means of frictional insertion, of static or dynamic constructions having a game or didactic purpose.

There are known several systems of elements of plastic material which can be mutually connected by means of frictional insertion, and which enable composing static constructions, to which some dynamic elements can also be applied. In most such systems each element is provided with at least one male coupling member and at least one female coupling member, and the composition is obtained by mutually inserting a male coupling member of an element into a female coupling member of another element. A first drawback resulting from this principle resides in that the male and female coupling members, since they pertain to the same elements, are unavoidably formed by the same material, whereby the efficiency of their frictional insertion only depends on the accuracy of the dimensions of the parts and on the own elasticity of the material. This material, since it should form the entire element, cannot be chosen with complete freedom, due to technical requirements, to reasons depending on a pleasant use and to economic restrictions. Therefrom there can result a somewhat weak coupling which, in particular, can be jeopardized by permanent deformations of elements remained connected for a long time, due to the so-called "cold flux" to which several plastic materials are subjected. This phenomenon is aggravated by the male coupling members generally having a very reduced extent.

A remedy to this drawback has been found, according to the Italian Patent No. 1.147.731, by means of elements in which the male coupling members are applied to the element body and, therefore, can be embodied in a material different from that forming the body of the elements and the female coupling members. However, it is evident the economical burden resulting both from the manufacture of the elements in several parts, and from the need of mounting together said parts.

Moreover, it is a common feature of most known systems that the symmetry of the coupling members is generally of order four, whereby the elements can be mutually connected only according to a number of positions which mutually differ by displacements of 90°. In those cases in which the arrangement according to a different angle, for example of 45°, should be allowed, this cannot be obtained by means of the normal elements of the system, and special elements intended for this purpose should be provided, however this is contrary both to the manufacture economy and the systematicity of the composition.

BRIEF SUMMARY OF THE INVENTION

A first object of this invention is that of improving the known systems of composable elements in order of systematically enabling, without the use of special elements, all element arrangements which mutually differ by displacements of 45°. Another object of the invention is that of rationalize the coupling members of the elements, in order to ensure effective and durable connections, though avoiding difficulties of manufacture and excessive expenses. A specific object of the invention is that of integrating the element system with base elements and possible other elements in order to expand the possibility of application of the system.

Still another specific object of the invention is that of enabling the application of dynamic elements capable of mutually co-operating, such as wheels and toothed wheels, even in constructions which extend in different planes.

The main object of the invention is attained, in a system of elements of plastic material intended for the composition, by means of frictional insertion, of static or dynamic constructions having a game of didactic purpose, in that the system comprises two kinds of main system elements, each main element of the first kind having the character of a substantially tubular spacer whose end portions form female coupling members having a symmetry of order eight, whilst each element of the second kind has the character of a connector formed by a thin flange provided on both sides with male coupling members, complementary to the female coupling members of the elements of the first kind, but having a symmetry of order four.

Thanks to this subdivision of the coupling tasks between two different main kinds of elements, various advantages are attained. The first and more evident advantage is that all elements may be composed according to all mutual angles which differ by 45°, without being compelled to use special elements. The resulting composition flexibility is evident. The systematic use of elements of the second kind for effecting the connections among the system elements of the first kind involves a construction rationality which is favourable to its didactic character. Moreover, the feature according to which the male coupling members have a symmetry of order four allows adopting for these elements extremely simple structures, easy to manufacture, without jeopardizing the flexibility of the composition which derives from the symmetry of order eight of the female coupling members.

Preferably, the male coupling members of the elements of the second kind comprise, on each side of the flange, four hollow cylindrical sleeves having circular cross section, and the female coupling members of the elements of the first kind are embodied by the shaping of the walls of the tubular elements, which walls are determined, in cross section, by eight circle arcs whose inner radius is equal to the outer radius of the cylindrical sleeves of the elements of the second kind.

This way, a large contact surface is obtained between the male and female coupling members, though with simple structures easily produced by forming the plastic material of the elements, and for the user it is extremely easy to determine the positions of correct connection between the elements.

Preferably, in the elements of the second kind, the hollow cylindrical sleeves forming the male coupling members lying on one side of the flange are displaced by 45° with respect to the hollow cylindrical sleeves forming the male coupling members lying on the other side of the flange.

In this manner, also the flange elasticity is exploited in order to ensure the better obtainment of the couplings and, both thanks to this arrangement and to the sleeves being hollow, a substantial uniformity in the thickness of the material is attained, which is useful in respect of the forming operation.

Preferably, the elements of the first kind are manufactured of a plastic material having high stability and pleasant appearance and touch, such as the ABS, whilst the elements of the second kind are manufactured of a plastic material having good elasticity, low friction coefficient and not subjected to cold flow deformation, such as a polyammidic or acetalic resin.

In this way a great stability and duration of the elements and their couplings is obtained. As it may be understood, such a provision could not be taken in the element systems wherein the elements are provided both of male and female coupling members, which are parts of the element body.

Preferably, the system also includes complex elements formed by an element mainly of the first kind which is provided with at least one male coupling member extending from a side wall. Such elements serve for providing angular junctions in the construction.

Preferably, said complex elements are provided with two male coupling members diametrically opposite or forming an angle between them. In a more complete form, they are provided with four male coupling members extending from the side wall and mutually spaced by 90°, thus embodying a six-way element.

It is of advantage that some of the male coupling members with which said complex elements are provided include an elastic axle on which can be rotatably inserted a wheel or a toothed wheel.

Preferably the male coupling members of the complex elements are provided with surfaces ending with six rims, arranged in such a way as to be able to co-operate according to two orthogonal directions inside the eight surfaces shaped as circle arcs, forming the walls of the elements of the first kind.

In this manner the elasticity of the wall of the elements of the first kind is advantageously exploited in order to improve the coupling.

Preferably, the system further includes elements intended for the connection to base plates, said elements being substantially formed by an element of the first kind, possibly of modified length, from an end portion of which extend some pins suitable for engaging bores of a base plate.

Preferably, the system further includes composable base plates provided with a matrix of connection bores to which can be connected in various positions the construction elements, by means of said elements for the connection to base plates.

Such composable base plates provided with a matrix of connection bores are per se known, but their field of application is extremely enlarged and rendered more satisfactory by the combination with the element system according to the invention.

Finally, it is of advantage that the system further includes movable elements, particularly wheels and toothed wheels, suitable for being installed onto said elastic axles of which some complex elements are provided. Said wheels and toothed wheels are advantageously provided with a matrix of connection bores suitable for receiving the application of figure elements or other parts of construction.

Also such toothed wheels provided with a matrix of connection bores are per se known, but their field of application is extremely enlarged and rendered more satisfactory by the combination with the element system according to the invention.

Advantageously, the main elements of the first kind and the complex elements of the system are provided in different sizes and, along with the elements of the second kind, they form a modular system which defines and includes the matrix of connecting bores of the plates, the dimensions of the plates, the axes spacing of the toothed wheels and the length of the elements of the first kind added to the thickness of the flanges of the elements of the second kind.

In this manner a correct composability of the parts and a correct mutual engagement of the toothed wheels are favourably influenced.

BRIEF DESCRIPTION OF THE DRAWINGS

These and other features, objects and advantages of the subject of this invention will appear more clearly from the following description of an embodiment having the character of a not limiting example, with reference to the appended drawing, wherein the sole FIGURE shows in an exploded view a number of elements forming the system according to the invention, arranged in mutual positions suitable for their later coupling.

DETAILED DESCRIPTION OF THE PREFERRED EMBODIMENT

Number 1 designates a main element of the first kind. As it may be remarked, this main element has the character of a substantially tubular spacer, whose wall is defined in cross section by eight mutually connected circle arcs having their concavities facing the axis of the element. This element may advantageously include, at the middle of its length, a bored cross screen 2 which strengthens the element. The wall of element 1 forms, by its end portions, two female coupling members which are intended to co-operate with male coupling members described later on. The main elements of the first kind may be provided in a number of different lengths, as it appears for example at 1 and 1', and it is clarified later on according to which criteria these lengths may be chosen. These elements of the first kind are intended to form the substantially visible part of the structure to be composed, and therefore they are preferably manufactured of a stable plastic material which is pleasant to the appearance and touch, such as ABS. As it will be understood, their simple structure is such that they can be manufactured economically by using simple molds free from movable parts, the so-called drawers.

Number 3 designates a flange forming the base of an element of the second kind. The outline of this flange 3 corresponds to the outline of a main element 1 of the first kind. From a side of this flange 2 project four hollow cylindrical sleeves 4 having a circular cross section, uniformly spaced, and from the opposite side project four other hollow cylindrical sleeves 5 also having a circular cross section. The outer radius of the sleeves 4 and 5 corresponds to the inner radius of the circle arcs forming the cross section of the wall of elements 1 of the first kind, and the distance between the centers of diametrically opposite sleeves corresponds to the distance between the centers of said arcs, whereby the four sleeves 4 or 5 of an element of the second kind can be coupled with four arcs among the eight arcs which determine the cross section of an element of the first kind. It will be remarked that the unique shaping with arcuate walls of the elements of the first kind also enables to exploit the form elasticity of these elements to the purpose of a correct coupling thereof. It will therefore be understood that an element of the second kind enables to couple in line two elements of the first kind, in all the mutual positions which differ by angular displacements of 45° around the axes of the elements. It will also be remarked that the elements of the second kind have a simple structure, thanks to that they can be manufactured economically by using simple molds free from drawers.

The elements of the second kind may advantageously be manufactured of a plastic material having good elasticity, low friction coefficient and not subjected to cold flow deformations. For this application are particularly suitable, for example, the polyammidic and acetalic resins.

It is of advantage that the four cylindrical sleeves 5 in the element of the second kind are displaced by 45°, on one side of flange 3, with respect to the corresponding four cylindrical sleeves 4 which are situated on the opposite side of flange 3. This arrangement is advantageous since it enables exploiting a certain elastic deformability of flange 3 in order to improve the couplings, and moreover, in addition to the sleeves being hollow, gives rise to a substantial uniformity in the thickness of the material, which is of advantage in forming the elements of the second kind.

The composition of the described elements of the first and second kind enables composing a linear construction of any extension. In order to enable extending the construction in other directions, by forming angular junctions, there are provided complex elements as that generally designated as 6. This element is formed by a wall 7 with eight arcs, corresponding substantially to the wall of a main element of the first kind, which forms at its end portions female coupling members intended to co-operate with elements of the second kind, but from this wall further projects sideways at least one male coupling member 8, which is intended to enable connecting the female coupling members of elements of the first kind (or of other complex elements similar to the element 6). The male coupling member 8 consists, as shown, in surfaces arranged in such a way that their rims can be inserted in the vertices of some arcs of the wall of an element of the first kind, thus obtaining the desired connection in an angular junction of the composed construction.

The complex element 6 shown has around its wall 7 four male coupling members 8 spaced by 90°, and therefore it forms a six-way element. It is to be understood, however, that similar complex elements having a lower complexity could be provided on their side walls 7 with three, two or even only one male coupling member 8.

Advantageously, the male coupling members 8 of the complex elements are formed by surfaces, in this case plane surfaces, which end with six rims. These rims are so arranged that they can operate, according to two orthogonal directions, inside the eight surfaces in the shape of circle arcs forming the wall of the elements of the first kind. This way the elasticity of the wall of the elements of the first kind is favourably exploited for a correct coupling. In order to obtain a stable coupling, corresponding to that obtained between the elements of the first and second kind, the interference between the male coupling members 8 and the female coupling members of the elements of the first kind is chosen larger than the interference between the elements of the first and second kind.

Moreover, in the complex element 8 shown, some male coupling members 8 project forming axles 9, which are cut vertically in order to be elastic, and on which some movable elements, such as wheels, toothed wheels and the like, can be rotatably mounted. Of course such axles can be foreseen on all complex elements 6 or only on some of them.

It will be remarked that also a complex element as 6, thanks to its appropriate design as shown by way of example, can be manufactured by using simple molds free from drawers, and therefore in conditions of economically advantageous manufacture.

Number 10 designates a toothed wheel provided with a bore 11 by means of which it can be mounted on an axle 9 of a complex element 6. Moreover, the toothed wheel 10 has connection bores 12 suitable for receiving the application of other elements, such as for example figure elements (not shown). Toothed wheels of this type are per se known, but their field of application is very enlarged by the combination with the element system according to the invention. The toothed wheels intended to be used in the element system of the invention can have a various number of teeth, which number is to be suitably chosen in order to ensure an easy obtainment of the distances among their axes which correspond to the modularity of the system.

A construction composed with the described elements can be stable per se, and it has no compulsory requirement for any base plate. However, in certain cases it is of advantage that the construction be erected on base plate elements. In view of such cases, the described elements can be caused to co-operate with composable base plates as the plate 13, which are provided with a matrix of coupling bores 14. Such plates are per se well known, but their field of application is very enlarged by the combination with the element system according to the invention.

In order to connect the described elements to a base plate there are provided special elements 15. Each this element is substantially formed by an element of the first kind, possibly having a not modular length, from whose bottom surface protrude some pins, for example four pins 16, suitable for engaging the coupling bores 14 of a base plate 13. This element enables to compose a constructions using the elements according to the invention, by starting from any point of a base structure formed composing a number of plates 13. Moreover, the same elements 15 can be engaged in the bores 12 of a toothed wheel 10, thus providing movable parts of the construction which are based on a toothed wheel.

The elements of the system according to the invention may be sized according to different criteria, but it is particularly foreseen that they are sized in order to form a modular system corresponding to the module of the matrix of coupling bores of base plates and toothed wheels, and also corresponding to the distances between the axes, according to which have been chosen the teeth numbers of the toothed wheels, in order to ensure that the toothed wheels engage regularly, irrespective of they being coplanar or angularly arranged. In particular, in order to ensure this latter possibility in special circumstances, some elements 15 having lengths different from the modular ones may be provided, these lengths being especially chosen, for example, in order to enable a correct engagement between not coplanar toothed wheels.

It will be remarked that the possibility of connecting the elements in positions mutually displaced by 45° also enables, by a suitable use of the elements forming a junction, to compose parts of construction which extend in inclined directions with respect to the own main orthogonal directions of the construction.

This invention should not be construed as limited to the embodiment described and shown by way of example. Several possible modifications have been described, and others will be evident to those skilled in the art. For example, the sizing and proportioning of the elements may be chosen in various manners, and other elements, in addition to the described ones, may be added for special purposes.

What is claimed is:

1. A system of elements of plastic material intended for the composition, by means of frictional insertion, of static or dynamic constructions having a game of didactic purpose, said system comprising main system elements of a first kind and a second kind, said two kinds of elements being different from one another, each main element of the first kind comprising a substantially tubular spacer having a wall and end portions, and including female coupling members having a symmetry of order eight, consisting in said end portions of the element of the first kind, and each main element of the second kind comprising a connector including a thin flange having two faces and, on both faces of said flange, male coupling members being complementary to the female coupling members of said elements of the first kind but having a symmetry of order four.

2. An element system as set forth in claim 1, wherein said male coupling members of the elements of the second kind comprise, on each side of said flange, four hollow cylindrical sleeves having circular cross section and all having an equal outer radius, and said female coupling members of the elements of the first kind comprise the end portions of the tubular elements, said end portions of the elements of the first kind being determined, in cross section, by eight subsequent circle arcs whose inner radius is equal to said outer radius of the cylindrical sleeves of the elements of the second kind.

3. An element system as set forth in claim 2, wherein the hollow cylindrical sleeves lying on one side of said flange of the elements of the second kind are displaced by 45° with respect to the hollow cylindrical sleeves lying on the other side of said flange.

4. An element system as set forth in claim 1, wherein said elements of the first kind are manufactured of a plastic material having high stability and pleasant appearance and touch, whilst the elements of the second kind are manufactured of a plastic material having good elasticity, low friction coefficient and no cold flow deformation.

5. An element system as set forth in claim 1, further including complex elements, each said complex element comprising an element of the first kind and at least one male coupling member extending from the wall of said element, whereby such complex elements serve for providing angular junctions in the construction.

6. An element system as set forth in claim 5, wherein said complex elements include two male coupling members diametrically opposite or forming an angle between them.

7. An element system as set forth in claim 5, wherein said complex elements include four male coupling members extending from the wall and mutually spaced by 90°, thus embodying a six-way element.

8. An element system as set forth in claim 5, wherein some of the male coupling members of said complex elements include an elastic axle on which can be rotatably inserted a wheel or a toothed wheel.

9. An element system as set forth in claim 8, further including movable elements, particularly wheels and toothed wheels, suitable for being installed onto said elastic axles of some complex elements.

10. An element system as set forth in claim 8, further including movable elements, particularly wheels and toothed wheels, having a matrix of connection bores suitable for receiving the application of figure elements or other parts of construction.

11. An element system as set forth in claim 5, wherein the male coupling members of the complex elements have surfaces ending with six rims, arranged in such a way as to be able to co-operate according to two orthogonal directions inside the eight surfaces shaped as circle arcs, forming the walls of the elements of the first kind.

12. An element system as set forth in claim 5, wherein the main elements of the first kind and the complex elements of the system are provided in different sizes and, along with the elements of the second kind, they form a modular system which defines and includes the matrix of connecting bores of the plates, the dimensions of the plates, the axes spacing of the toothed wheels and the length of the elements of the first kind added to the thickness of the flanges of the elements of the second kind.

13. An element system as set forth in claim 1, further including elements intended for the connection to plates, said elements being substantially formed by an element of the first kind having an end surface, and including some pins, extending from said end portion, suitable for engaging bores of a base plate.

14. An element system as set forth in claim 13, further including composable base plates having a matrix of connection bores to which can be connected in various positions said elements for the connection to plates.

* * * * *